June 3, 1958 — W. R. AIKEN — 2,837,691

ELECTRONIC DEVICE

Filed Aug. 24, 1955 — 2 Sheets-Sheet 1

INVENTOR
WILLIAM R. AIKEN

BY James E. Toomey

ATTORNEY

June 3, 1958 W. R. AIKEN 2,837,691

ELECTRONIC DEVICE

Filed Aug. 24, 1955 2 Sheets-Sheet 2

INVENTOR

WILLIAM R. AIKEN

BY *James E. Toomey*

ATTORNEY

United States Patent Office 2,837,691

Patented June 3, 1958

2,837,691

ELECTRONIC DEVICE

William Ross Aiken, Los Altos, Calif., assignor, by mesne assignments, to Kaiser Industries Corporation, a corporation of Nevada Application August 24, 1955, Serial No. 530,281

5 Claims. (Cl. 315—23)

The present invention is directed to a new and novel cathode ray tube, and more particularly to a cathode ray tube of the type wherein the electron beam is caused to be passed through different voltage zones which causes the beam to act in accordance with the electrical characteristics of the various zones.

The tube of the present invention is known in the art as the "Aiken-type" cathode ray tube and is disclosed in applicant's copending applications having Serial No. 355,965 which was filed May 19, 1953, now abandoned, and Serial No. 396,120 which was filed December 4, 1953, and issued June 11, 1957, as Patent No. 2,795,731.

The Aiken-type tube, in its basic concepts, is comprised of a configuration which approximates that of a picture adapted for wall mounting. In a smaller size, the tube is comparable in size and shape to a metropolitan telephone directory.

The numerous advantages and applications of the so-called Aiken-type tube are well known to persons skilled in the art. Prominent among the features and advantages attendant a tube of this general type are its overall compactness which permits the use thereof in smaller areas; extremely high definition and resolution which results from the inherently sharp electrostatic focus arrangement; the reduction in expensive components resulting from the use of only electrostatic deflection elements; and the elimination of high voltage deflection yokes, vertical and horizontal output transformers, magnetic deflection coils, and others of the bulky and expensive components now incidental to the vertical and horizontal stages for use with cathode ray tubes now known in the art. The novel tube also is featured by the reduction in weight in its physical mass, and the minimization and simplification of adjustment of the tube for use in the desired applications; its flexibility and adaptation to mounting in various positions and in association with other equipment, and its adaptability for use with other types of electronic and optical units. These, and other features and advantages have been set forth only briefly herein, and numerous other features and advantages will doubtless be apparent to persons skilled in the art.

In one embodiment, the tube is encased in a simple housing which is adapted to be hung on the wall. Control dials may be mounted at any portion of the periphery or alternatively may be extended by cable means to remote control position in a manner well known in the art. The tube may be transparent in nature whereby the unit may be readily mounted in the direct line of vision of the operator of an aircraft or the like. In such event, the switching equipment would be available to the operator for effecting presentation of a picture on the screen only at such times as the operator so desires.

A more complete understanding of the instant invention may be had by a brief discussion of the invention disclosed and claimed in applicant's copending application Serial No. 355,965 which relates to a cathode ray tube wherein the electron gun is disposed in such a manner relative to the target area of the tube that its scanning beam passes parallel and closely adjacent to the luminescent face of said target area, and means are provided to deflect the beam selectively to consecutively different levels toward the target area so that the beam will strike consecutively different levels of the luminescent coating thereof and recreate the visual television image thereon. As a result of the above described arrangement, it is possible to make an electronic television picture tube in the shape of a shallow envelope. In certain embodiments it is desirable to minimize "keystoning" effects in the final display presented on the luminescent face of the target due to the fact that the electron gun is disposed in extremely close relation with respect to the substantially rectangular target so that the area scanned by the electron beam which originates and oscillates from a point source would be in the form of a keystone. By means of the instant invention, a novel cathode ray tube is produced which provides a substantially rectilinear display on the target area thereof.

The invention depicts a novel variation of the Aiken-type tube wherein the instant structure comprises three elementary sections; which may be termed as the primary, intermediate, and secondary sections. The primary section comprises two electrode elements between which there is established a first voltage zone. The secondary section of the tube comprises a set of vertical deflection elements and an electron sensitive target. The deflection set and the target are maintained at substantially equal potential which potential is of a higher order than that of the electrodes of the primary section. The intermediate section comprises an electron lens, reflector arrangement or the like and may be operated within a voltage range substantially equal to either the primary or secondary sections.

The electron beam emitted by the electron gun employed in the instant tube is adapted to be delivered in such a fashion that it is caused to successively travel through the primary, intermediate, and secondary sections of the tube.

By maintaining the secondary section at a voltage value higher than the primary section, the electron beam passing into the secondary section actually "sees" or encounters a converging field and is thereby focussed or converged into a smaller and more dense cross-sectional configuration, and as the electron beam emerges from the intermediate section of the tube, the paths of travel thereof are substantially parallel to one another and accordingly, will present a rectilinear display when caused to be deflected into impingement with the target upon suitable lowering of the voltages on the selected one or ones of the vertical deflection set.

Figure 1:
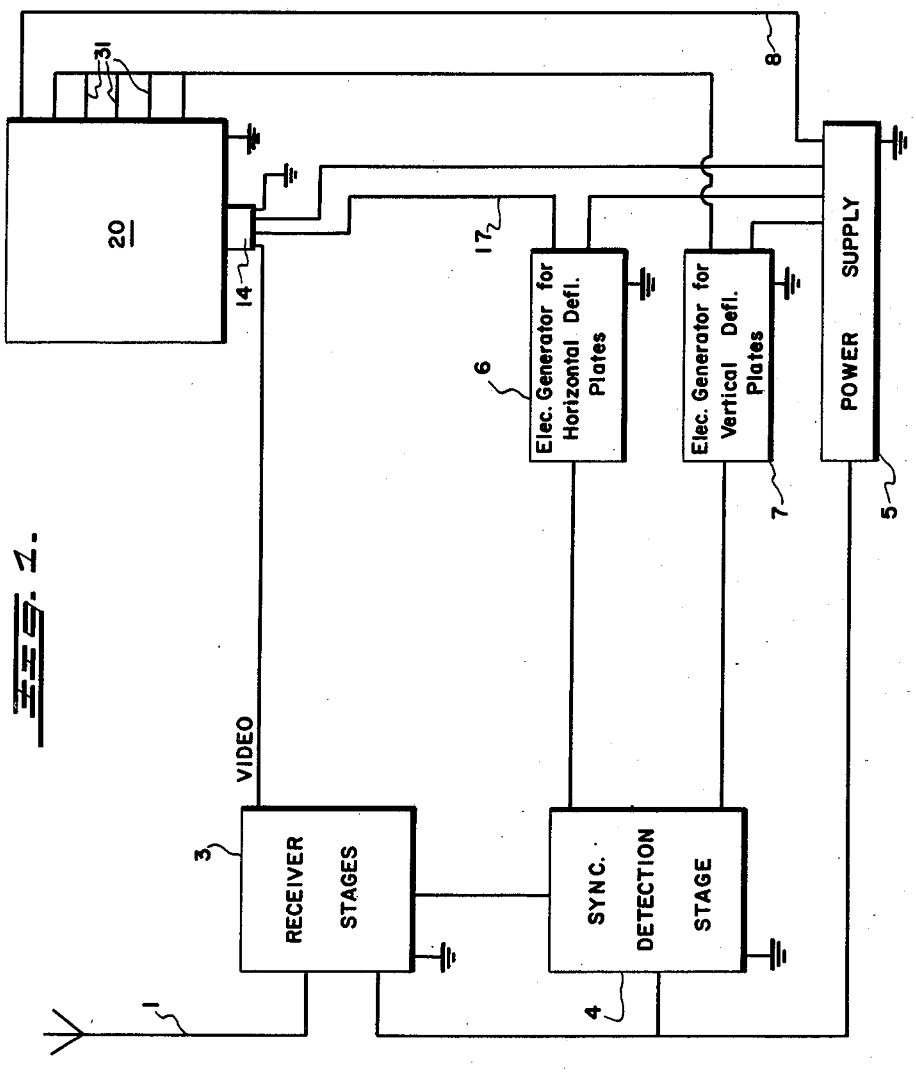
Figure 1 is a schematic illustration of a system employing the novel cathode ray tube of the instant invention.

Figure 1 shows, in block form, a system for satisfactorily operating the cathode ray tube of the instant invention as a television picture tube. The transmitted signal is received by an antenna 1 which feeds both the video and audio signals into a television receiver indicated by numeral 3. For purposes of simplification, only the video portion of the electronic circuitry will be discussed and described hereinafter. The video signal, to be displayed, is fed to the receiver stage 3 which may include the R.-F. amplifier, the I.-F. amplifier, and the video amplifier. The receiver stage 3 is adapted to pass a video signal to the electron gun 14 of the cathode ray tube of the instant invention. Also, the receiver stage 3 is adapted to pass a signal to the sync deflection stage 4 which, in turn, is adapted to separate the signals for energizing the electric generator 6 for the deflection plates 16 of the electron gun 14 through suitable conductors 17 and the electric generator 7 for the vertical deflection elements 30 through suitable conductors 31. The sync detection stage 4 provides the necessary synchronization between the transmitting and receiving scanning operations.

Further, it will be noted that a power supply 5 is provided to properly energize the various components of the system as well as the individual components of the tube. For purposes of simplification, there is shown in Figure 1 various lines, each of which may represent a single conductor or a plurality of conductors necessary to electrically couple the power supply 5 to certain of the internal electrode elements of the tube including the electrode arrangement of the primary section, the electron lens arrangement of the intermediate section of the tube and the target. These will be hereinafter described in detail in connection with Figures 2 and 3.

Figure 2:
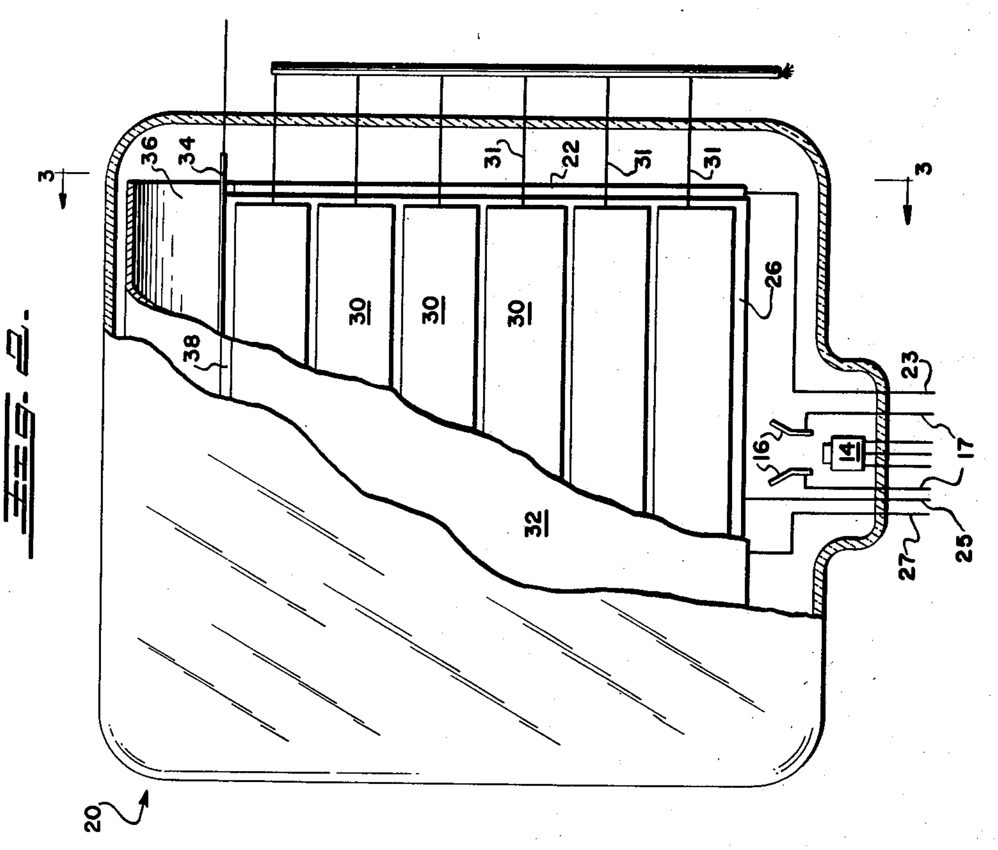
Figure 2 is a front view of the tube of the instant invention.
Figure 3:
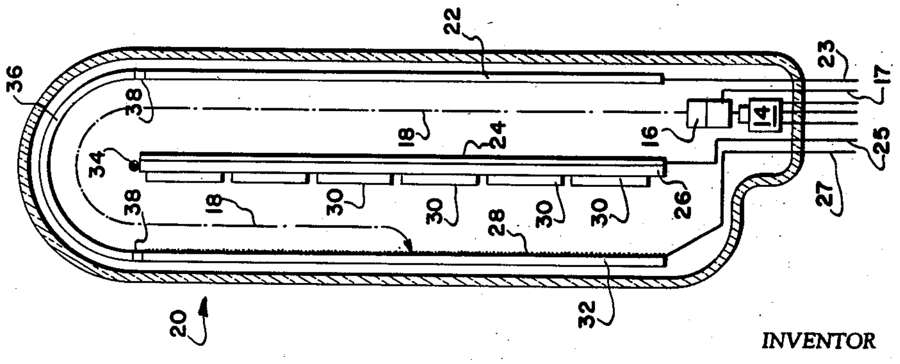
Figure 3 is a vertical sectional view taken along line 3—3 of Figure 2.

As illustrated in Figures 2 and 3, the novel tube comprises a shallow or flat evacuated envelope 20 having disposed therewithin the elements comprising the internal structure. An electron gun 14 is disposed within the envelope 20 and is adapted to deliver an emergent beam of electrons along a path 18. The electron gun 14 is provided with a set of conventional electrostatic deflection electrodes 16 operative upon suitable energization by the electric generator 6 to effect movement of the electron beam 18 through a single plane.

It must be pointed out that the employment of electromagnetic deflection means may likewise be employed to effect the desired deflection of the beam. However, it has been found in practice that the employment of electrostatic deflection effected by deflection electrodes such as illustrated in Figures 2 and 3 have very satisfactorily achieved the desired results.

The so-called primary section of the tube comprises a pair of electrically conducting plates or electrodes 22 and 24 which are disposed in a manner such that the electron beam 18 will travel along a path intermediate thereof. Electrical conductors 23 and 25 are provided to electrically couple the plates 22 and 24, respectively, to the electrical power supply 5 situated outside the envelope 20.

The so-called secondary section of the tube comprises a plurality of vertical deflection electrodes 28 which are suitably affixed to a mounting plate 26, the mounting plate 26 also acts to satisfactorily maintain an electrically isolated condition between the vertical deflection electrodes 30 and the conducting plate 24. Each of the vertical deflection electrodes 30 is energized from an electric generator situated outside of the tube envelope 20 through electrical conductors 31 clearly illustrated in Figure 2.

The other portion of the secondary section of the tube comprises the display or image producing area which includes a target 28 of an electron excitable material, such as Phosphor, having light emitting properties when impacted by a beam of electrons. The target 28 is suitably affixed to an optically transparent mounting plate 32 which is formed of glass or the like. The target is maintained at the desired potential value from a power supply through an electrical conductor 27.

The intermediate section of the instant tube comprises an electron lens or mirror arrangement which includes a pair of electrodes disposed in co-axial relation relative to one another. The inner electrode 34 of the electron lens is disposed along the upper marginal edge of non-conducting plate 26 and is maintained at the desired potential value from the power supply 5 through a suitable electrical conductor.

The outer electrode 36 of the electron lens arrangement is disposed in insulatingly spaced relation with respect to the conducting plate 22 and the mounting plate 32 by means of insulating strips 38 as illustrated in Figure 3. It must be understood that various other shapes and types of electron lens arrangements may be employed herein. However, the preferred type shown in Figures 2 and 3 has been proven to be satisfactory.

It is deemed appropriate to explain at this point that certain rearrangement of the elements of the secondary section are well within the contemplation and scope of the instant invention. Such rearrangement of elements may be, for example, the disposition of the target 28 on the insulating plate 26 and the disposition of the vertical deflection elements 30 on the transparent mounting plate 32. In such a rearrangement it will be manifest that the vertical deflection elements must be formed of an optically transparent and electrically conducting material such as, for example, glass, so that a display presented on the target 28 may be viewed from a point outside the tube.

In operation, the electron gun 14 is caused to deliver an electron beam 18 into the primary section defined by the electrodes 22 and 24. These electrodes are maintained at a suitable low voltage such as, for example, 100 volts. It will be readily discernible that by maintaining each of the electrodes 22 and 24 at an equal or substantially equal potential value, a field-free region is established therebetween. The field-free zone will not subject the electron beam 18 as it passes therethrough to any spurious electric fields which if present would interfere with the beam travel.

As the emergent electron beam 18 passes through the aforementioned voltage zone of the primary section, it enters the intermediate section of the tube which is characterized by the electron lens arrangement including the electrodes 34 and 36. In order to effect the desired 180° deflection of the electron beam 18 from the primary section to the secondary section of the tube, the inner electrode 34 must be maintained at a voltage positive with respect to the cathode potential of the electron gun 14; and the outer electrode 36 must be maintained at a voltage negative with respect to the cathode potential of the electron gun 14. Thus by suitable adjustment of the relative voltages, the electron beam 18 is caused to be bent and directed into the secondary section of the tube. It must be understood that the outer electrode 36 is always maintained more negative or less positive than the inner electrode 34 in order to effect the desired deflection.

The electron beam 18, subsequent to its deflection in the intermediate section, is caused to enter the zone referred to as the secondary section which is defined by the vertical deflection electrodes 30 and the target 28. Initially, both the set of the deflection electrodes 30 and the target 28 are maintained at a high voltage value in the order of 10 kv. The relatively higher voltage of the secondary section as compared to the primary section causes the electron beam 18 to assume a path in the secondary section which is substantially parallel to the target 28.

In explaining the manner in which the two-step voltage arrangement affects the electron beam, it is necessary to describe the forces acting thereupon. Initially, the beam 18 passes in the primary section defined by the conducting plates 22 and 24, and is caused to oscillate under the control of the electric field established by the deflection plates 16. The area scanned by the oscillating beam is substantially fan-shaped with the apex of the fan residing at a point between the deflection plates 16. It will be easily discerned that the path of the beam 18 in the primary section may be translated into velocity vectors. One of these vectors representing the forward velocity and the other vector representing the side velocity which is perpendicular to the forward velocity vector. The resultant vector will then describe the actual direction and velocity of the beam. For purposes of explanation, let us assume that the forward and side velocity components in the vector analysis of the beam as it travels along one of the limits of the aforementioned fan-shaped area are 100 volts in each direction. Therefore, when the beam enters the secondary section after being deflected in the intermediate section its vector components are equal to 100 units in the forward and side direction, assuming that the intermediate section is maintained at substantially the same potential as the primary section. As mentioned hereinabove, the potential applied to the elements defining the secondary section is equal to 10 kv. This potential establishes an electric field which acts upon the electron beam 18 and causes the beam vector in the forward direction in the secondary section to increase as compared to the forward velocity vector in the primary section, while the side velocity vector remains constant.

Now, it may be readily understood that the resultant vector which describes the actual path of the beam will be only slightly displaced from the vector representing the forward velocity vector, because the side velocity vector has remained substantially constant and the forward velocity vector has been increased very considerably. Accordingly, the beam 18 assumes a path of travel in the secondary section which nearly parallels the vertical edge of the target 28 enabling a complete scanning procedure of the entire target 28.

Figure 4:
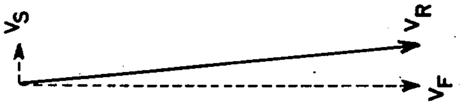
Figure 4 is a vector diagram of the forces acting on the electron beam in the secondary section of the tube.

A diagrammatic illustration of the vector analysis of the electron beam 18 in the secondary section is shown in Figure 4. Figure 4 shows the forward velocity vector as $V_F$; the side velocity vector as $V_S$; and the resultant vector as $V_R$. The vector $V_R$ shows the actual direction of travel of the electron beam in the secondary section.

From the foregoing description, it is apparent that substantial power savings can be effected in the operation of the tube due to the fact that beam deflection is accomplished in a relatively low voltage primary section rather than in a high voltage zone. For example, in one embodiment, the electron gun 14 is operated at the relatively low potential of 1 kv. and the primary section comprising electrodes 22 and 24 is also maintained at 1 kv. Lateral deflection of the electron beam 18 within the field-free region established between the electrodes 22 and 24 is then effected by relatively small power requirements due to the fact that the forward velocity of the beam is relatively low.

The beam 18 will travel downwardly in the secondary section until such time as one of the deflection elements 30 is caused to be energized and thereby establishes an electric field which is negative with respect to the cathode potential of the electron gun 14. When the beam 18 "sees" this relatively negative field, it is caused to be deflected away from the deflection elements, thus energized, and will impinge on the target 28. Upon such electron impingement, the fluorescent material of the target 28 becomes excited and will give off energy in the form of visible light which may be readily viewed outside the tube envelope 20 through the transparent mounting plate 32.

The broad principle described in connection with the instant tube is also utilized in other cathode ray tubes, such as the tube described in application Serial No. 521,201 which was filed July 11, 1955. In that tube, the electron beam is operated at a comparatively low velocity in the primary section where deflection forces are applied to the beam. Thereafter, the beam is directed into the high voltage section which increases the velocity of the beam and provides a more vertical trace.

It may be readily ascertained that the instant novel tube may be employed for use as a television picture tube wherein the electron beam 18 is caused to oscillate at line scan frequency under the control of the deflection plates 16. By proper synchronization between the activation of these deflection plates 16 and deflection elements 30, a raster may be achieved. An electric generator which may be satisfactorily employed to energize the deflection elements 30 is shown and described in co-pending applications Serial No. 355,965 which was filed May 19, 1953, and Serial No. 396,120, which was filed December 4, 1953.

It will be manifest that the instant device may be satisfactorily and advantageously employed in many other electronic applications, such as for example, aircraft navigational equipment, waveform analysis, and other applications too numerous to mention.

An advantageous embodiment of the invention has been herein disclosed and described. It is obvious that various changes and modifications may be made therein without departing from the spirit and scope as defined by the appended claims, wherein what is claimed is:

1. A method of presenting a visual signal in an electron sensitive target, which comprises the steps of delivering a beam along a given path, applying low voltage deflection forces to said beam to deflect same to different paths in a given plane, applying low voltage deflecting forces to bend the beam from the paths in said plane to corresponding paths in a second plane, and applying high voltage deflection forces to said beam to bend same from said second plane into registration with said target.

2. A method of presenting a visual signal on an electron sensitive target which comprises delivering a beam of electrons along a first path through a first voltage zone adjacent a surface of said target, next applying low voltage deflecting forces to said beam causing same to be deflected to a second path in a second voltage zone adjacent a second surface of said target, said second voltage zone being of a greater value than said first voltage zone, and subsequently applying high voltage deflecting forces to said beam causing same to impinge on said target.

3. An electron discharge device comprising a target, an electron beam source for delivering a beam along a given path, sweep means disposed adjacent said path for deflecting said beam to different paths in a given plane, a low voltage zone including low voltage deflection means for applying deflecting forces to bend the beam from the paths in said plane to corresponding paths in a second plane, and a high voltage zone for increasing the beam velocity therein including high voltage deflecting means disposed adjacent the paths of said beam in said second plane for bending the beam into registration with said target.

4. An electron discharge device comprising a high voltage zone including a target and a high voltage deflection set, an electron beam source for delivering a beam along a given path in a plane parallel to said target, sweep means disposed adjacent said path for deflecting said beam to different paths in said plane, and low voltage deflection means disposed adjacent a marginal edge of said target for applying deflecting forces to bend the beam from the paths in said plane to corresponding paths in a second plane lying between said target and said high voltage deflection set for deflection by the high voltage deflection means into registration with said target.

5. In an electron device including means for delivering a beam of electrons along a given path, means for establishing a low voltage zone at one interval along a beam path for effecting low forward velocity of the beam therein including low voltage sweep means for deflecting the beam to different paths in said zone, a high voltage zone including a target and high voltage deflection set, and means for applying low voltage deflection forces to said beam to bend same from said first zone to paths in a second plane adjacent said high voltage set for deflection thereby into registration with said target.

References Cited in the file of this patent

UNITED STATES PATENTS

| | | |
|---|---|---|
| 1,810,018 | Howes | June 16, 1931 |
| 2,053,537 | Schlesinger | Sept. 8, 1936 |
| 2,083,204 | Schlesinger | June 8, 1937 |
| 2,289,319 | Strobel | July 7, 1942 |
| 2,348,133 | Iams | May 2, 1944 |
| 2,383,751 | Spangenberg | Aug. 28, 1945 |
| 2,513,742 | Pinciroli | July 4, 1950 |
| 2,565,357 | Donal | Aug. 21, 1951 |